US012631743B2

(12) United States Patent
Liu et al.

(10) Patent No.: US 12,631,743 B2
(45) Date of Patent: May 19, 2026

(54) RADIO FREQUENCY SENSING WITH MULTI-SEGMENT SENSING SIGNAL

(71) Applicant: QUALCOMM Incorporated, San Diego, CA (US)

(72) Inventors: Kangqi Liu, San Diego, CA (US); Weimin Duan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 329 days.

(21) Appl. No.: 18/350,014

(22) Filed: Jul. 11, 2023

(65) Prior Publication Data

US 2025/0020789 A1 Jan. 16, 2025

(51) Int. Cl.
*G01S 13/58* (2006.01)
*G01S 7/00* (2006.01)
*G01S 13/00* (2006.01)

(52) U.S. Cl.
CPC ............ *G01S 13/584* (2013.01); *G01S 7/006* (2013.01); *G01S 13/003* (2013.01)

(58) Field of Classification Search
CPC ...... G01S 13/584; G01S 7/006; G01S 13/003; G01S 1/0428
See application file for complete search history.

(56) References Cited

U.S. PATENT DOCUMENTS

| | | | |
|---|---|---|---|
| 11,696,328 B2 | 7/2023 | Zorgui et al. | |
| 2005/0156780 A1* | 7/2005 | Bonthron | G01S 3/48 342/134 |
| 2008/0088500 A1* | 4/2008 | Ishii | G01S 13/584 342/70 |
| 2020/0260225 A1* | 8/2020 | Herschfelt | G01S 19/49 |
| 2021/0302535 A9* | 9/2021 | Vigier | G01S 7/4056 |
| 2021/0389452 A1* | 12/2021 | Lau | G01S 13/347 |
| 2022/0256519 A1 | 8/2022 | Jeon et al. | |
| 2022/0268877 A1* | 8/2022 | Uchida | G01S 7/006 |
| 2022/0413098 A1* | 12/2022 | Höller | G01S 7/4815 |
| 2025/0234343 A1* | 7/2025 | Shahsavari | H04L 5/003 |

FOREIGN PATENT DOCUMENTS

| | | |
|---|---|---|
| JP | 2004085452 A | 3/2004 |
| KR | 101092567 B1 | 12/2011 |

OTHER PUBLICATIONS

International Search Report and Written Opinion—PCT/US2024/035206—ISA/EPO—Oct. 1, 2024.

* cited by examiner

*Primary Examiner* — William Kelleher
*Assistant Examiner* — Kenneth W Good
(74) *Attorney, Agent, or Firm* — Holland & Hart LLP

(57) ABSTRACT

A radio frequency sensing method includes: obtaining, at an apparatus, a sensing signal configuration of a sensing signal in response to a request for radio frequency sensing, the sensing signal configuration indicating a first segment with a monotonically increasing frequency over a first length of time, indicating a second segment with a monotonically decreasing frequency over a second length of time, and indicating a third segment with a monotonically changing frequency over a third length of time that is shorter than the first length of time and the second length of time; and transmitting the sensing signal configuration from the apparatus, or transmitting the sensing signal from the apparatus, or transmitting the sensing signal configuration and the sensing signal from the apparatus, or receiving and measuring the sensing signal at the apparatus, or any combination of two or more thereof.

22 Claims, 12 Drawing Sheets

2100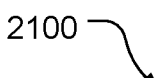

Obtaining, at an apparatus, a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time

2110

Transmitting the sensing signal configuration from the apparatus, or transmitting the sensing signal from the apparatus, or transmitting the sensing signal configuration and the sensing signal from the apparatus, or receiving and measuring the sensing signal at the apparatus, or any combination of two or more thereof

RADIO FREQUENCY SENSING WITH MULTI-SEGMENT SENSING SIGNAL

BACKGROUND

Wireless communication systems have developed through various generations, including a first-generation analog wireless phone service (1G), a second-generation (2G) digital wireless phone service (including interim 2.5G and 2.7 5G networks), a third-generation (3G) high speed data, Internet-capable wireless service, a fourth-generation (4G) service (e.g., Long Term Evolution (LTE) or WiMax®), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

As the bandwidth allocated for cellular communications systems (5G and 5G+) becomes larger and more use cases are introduced with cellular communications system, joint communication/RF (Radio Frequency) sensing (JCS) gains importance for cellular systems (for example, sixth-generation (6G) service). A JCS is an integrated system where each of one or more signals can be used to perform wireless communications and radar sensing, e.g., simultaneously. In a JCS, time/frequency/spatial radio resources are allocated to support two purposes (communication and sensing) in the integrated system. A JCS can improve cost efficiency for both radar and communication systems. In radar systems, probing signals are sent to uncooperative or cooperative targets, and useful information (e.g., ranges and directions to the target objects from a signal source) may be inferred from signal echoes from the target objects. In communication systems, information is transferred (and possibly exchanged) between two or more cooperative transceivers. Cooperative transceivers are able to receive signals transmitted by other cooperative transceivers. Uncooperative transceivers are unable or unwilling to receive signals from a particular signal source and/or to transmit signals capable of being processed by the signal source.

SUMMARY

An example apparatus includes: one or more transceivers; one or more memories; and one or more processors, communicatively coupled to the one or more transceivers and the one or more memories; wherein: the one or more processors are configured to obtain a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and the one or more processors are configured to transmit, via the one or more transceivers, the sensing signal configuration, or the one or more processors are configured to transmit, via the one or more transceivers, the sensing signal, or the one or more processors are configured to transmit, via the one or more transceivers, the sensing signal configuration and the sensing signal, or the one or more processors are configured to receive, via the one or more transceivers, and measure the sensing signal.

An example radio frequency sensing method includes: obtaining, at an apparatus, a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and transmitting the sensing signal configuration from the apparatus, or transmitting the sensing signal from the apparatus, or transmitting the sensing signal configuration and the sensing signal from the apparatus, or receiving and measuring the sensing signal at the apparatus, or any combination of two or more thereof.

Another example apparatus includes: means for obtaining a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and means for transmitting the sensing signal configuration from the apparatus, or means for transmitting the sensing signal from the apparatus, or means for transmitting the sensing signal configuration and the sensing signal from the apparatus, or means for receiving and measuring the sensing signal at the apparatus, or any combination of two or more thereof.

An example non-transitory, processor-readable storage medium includes processor-readable instructions to cause one or more processors of an apparatus to: obtain a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and transmit the sensing signal configuration from the apparatus, or transmit the sensing signal from the apparatus, or transmit the sensing signal configuration and the sensing signal from the apparatus, or receive and measure the sensing signal at the apparatus, or any combination of two or more thereof.

BRIEF DESCRIPTION OF THE DRAWINGS

FIG. 21 is a block flow diagram of radio frequency sensing method.

DETAILED DESCRIPTION

Figure 1:
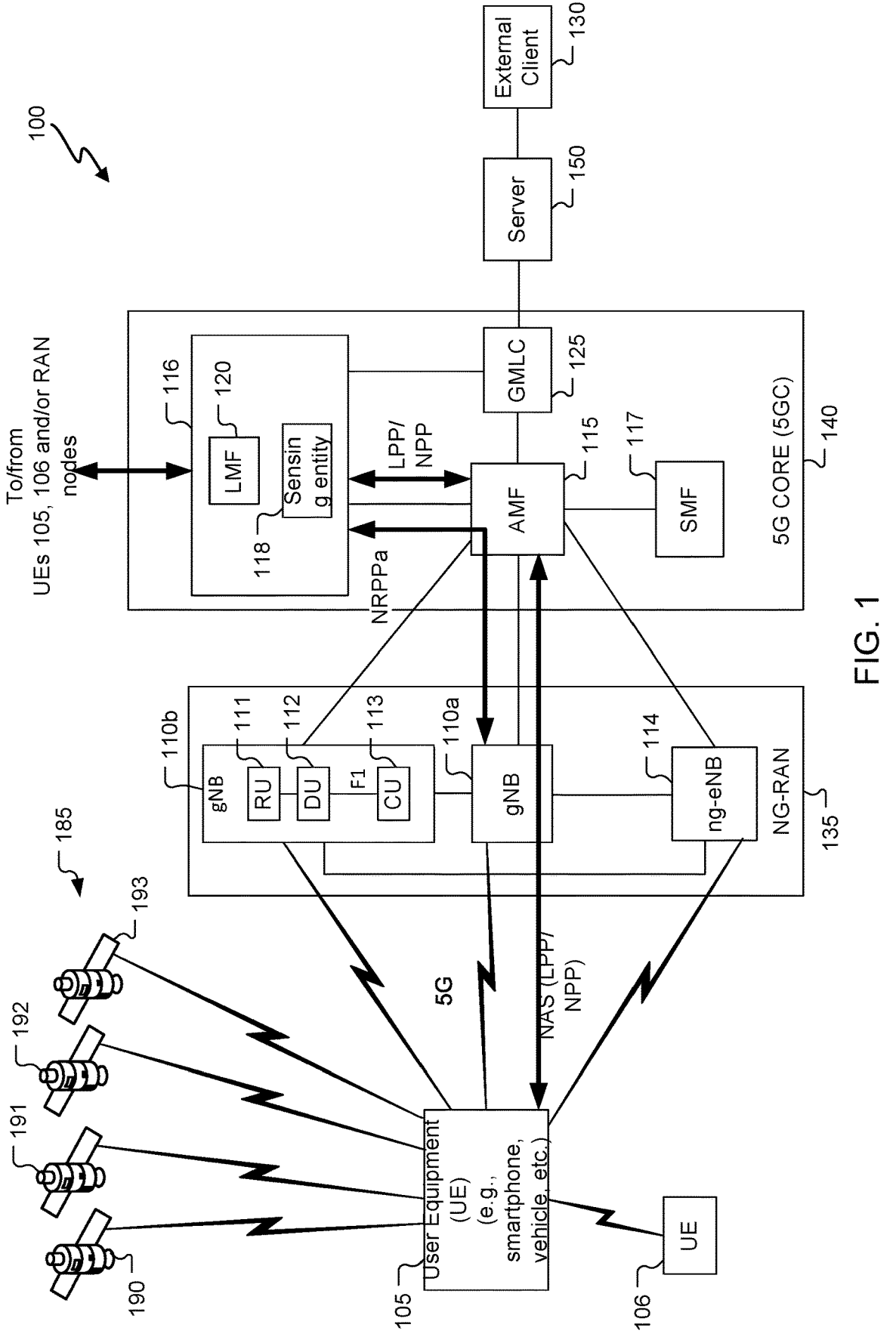
FIG. 1 is a simplified diagram of an example wireless communications system.

Techniques are discussed herein for determining velocity and range of one or more target objects. For example, a sensing signal may be transmitted that has a fast chirp segment, a slow downchirp segment, and a slow upchirp segment. The fast chirp segment varies in frequency over time. The slow chirp segments vary in frequency slower than the fast chirp segment. Measurements of the different portions of the sensing signal may be used to determine a range to and a velocity of a target object. The sensing signal may include a constant-frequency segment, and measurements of the different chirp segments and the constant-frequency segment may be used to determine ranges to and velocities of multiple target objects within range of one or more sensing signal transmitters and one or more sensing signal receivers. Other configurations/implementations, however, may be used.

Items and/or techniques described herein may provide one or more of the following capabilities, as well as other capabilities not mentioned. Velocities and ranges of actual target objects may be determined while avoiding considering ghost objects as actual objects. Higher spectrum efficiency compared to legacy radar waveforms may be achieved as sensing can be completed with measurement of a single waveform pattern, e.g., without repeated transmission of the pattern and/or without measurement of multiple instances of the pattern. During a continuous-wave portion of a sensing waveform, one or more signals may be transmitted for one or more other (non-sensing) purposes such as for communication in a FDM (Frequency Division Multiplexed) manner. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

Radio frequency sensing (RF sensing) may be used to determine information about an environment of a device. In RF sensing, an RF signal is transmitted by a transmitter, reflected off a target object, and received by a receiver. The received signal may be used to determine characteristics of the target object, e.g., location, size, material, movement, etc. RF sensing may be achieved using various techniques such as radar, radio frequency identification (RFID), and/or wireless sensor networks. In RFID techniques, RF signals may be used for identification and/or tracking. Tags or transponders that contain a unique identifier may communicate with RFID readers using RF signals. By placing the RFID tags on objects, the objects may be identified, tracked, and managed. RF sensing may be used for a variety of applications such as automotive (collision avoidance, autonomous driving, adaptive cruise control, etc.), surveillance and security, object detection, inventory management, medication management, environmental monitoring, etc.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various examples described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, a UE may be any wireless communication device (e.g., a mobile phone, router, tablet computer, laptop computer, consumer asset tracking device, Internet of Things (IoT) device, etc.) used to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi® networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or another device. A 5G network may also be referred to as a New Radio (NR) network; NG-RAN 135 may be referred to as a 5G RAN or as an NR RAN; and 5GC 140 may be referred to as an NG Core network (NGC).

Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, network entities 116 (including a sensing entity 118, and a Location Management Function (LMF) 120), and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the network entities 116, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi®, WiFi®-Direct (WiFi®-D), Bluetooth®, Bluetooth®-low energy (BLE), Zigbee®, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g., a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs

115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNo-deB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi® communication, multiple frequencies of Wi-Fi® communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to- Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi® (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi® (also referred to as Wi-Fi®), Bluetooth® (BT), Worldwide Interoperability for Microwave Access (WiMax®), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi® Direct (WiFi®-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The gNBs 110*a*, 110*b* and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110*a*, 110*b* and/or the ng-eNB 114 may include a radio unit (RU), a distributed unit (DU), and a central unit (CU). For example, the gNB 110*b* includes an RU 111, a DU 112, and a CU 113. The RU 111, DU 112, and CU 113 divide functionality of the gNB 110*b*. While the gNB 110*b* is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110*b*. The DU 112 hosts the Radio Link Control (RLC), Medium Access Control (MAC), and physical layers of the gNB 110*b*. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110*b*. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The sensing entity 118 and the LMF 120 may communicate directly with the UE 105, e.g., through wireless communications, or directly with the gNBs 110a, 110b and/or the ng-eNB 114. The sensing entity 118 may support RF sensing operations and process RF sensing requests, e.g., by determining and providing sensing signal configurations. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/ system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g., by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates, sensing information, and/or information provided by the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the network entities 116 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the network entities 116, and/or between the ng-eNB 114 and the network entities 116, via the AMF 115. As further illustrated in FIG. 1, the network entities 116 and the UE 105 may communicate using an LTE Positioning Protocol (LPP), which may be defined in 3GPP TS 36.355. The network entities 116 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the network entities 116 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS or PRS transmissions from the gNBs 110a, 110b, and/or the ng-eNB 114. One or more of the network entities 116 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the network entities 116 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi® AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi® access for the UE 105 and may comprise one or more WiFi® APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi® APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the position of the UE.

Figure 2:
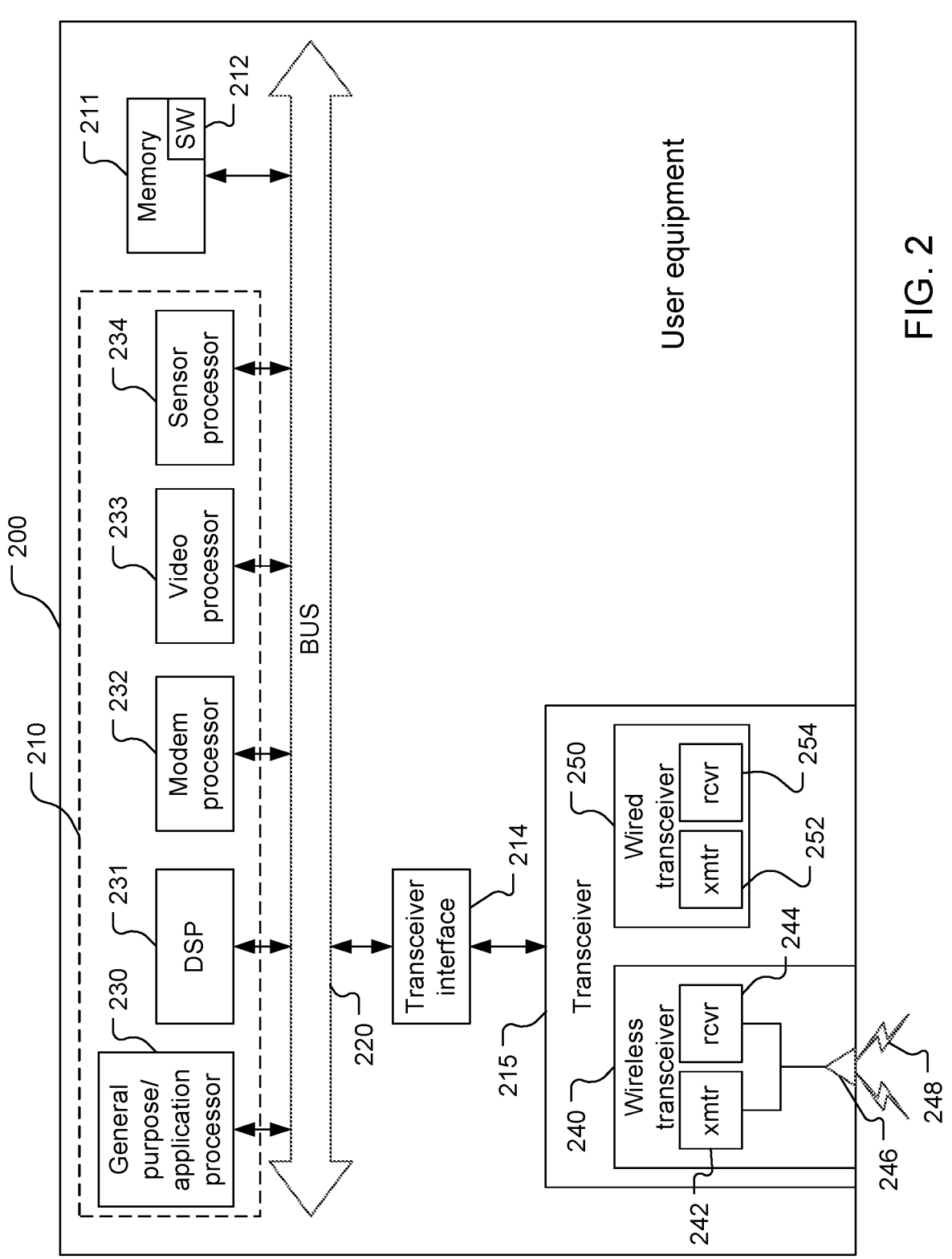
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, and a transceiver interface 214 for a transceiver 215 (that includes a wireless transceiver 240 and a wired transceiver 250). The processor 210, the memory 211, and the transceiver interface 214 may be communicatively coupled to each other by a bus 220 (which may be configured, e.g., for optical and/or electrical communication). The UE 200 may include one or more apparatus not shown (e.g., a camera, a position device, and/or one or more sensors, etc.). The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of sensors, a user interface, an SPS receiver, a camera, and/or a position device (e.g., for determining position of the UE 200 by means other than satellite signals).

The UE 200 may comprise the modem processor 232 that may be capable of performing baseband processing of signals received and down-converted by the transceiver 215. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

Figure 3:
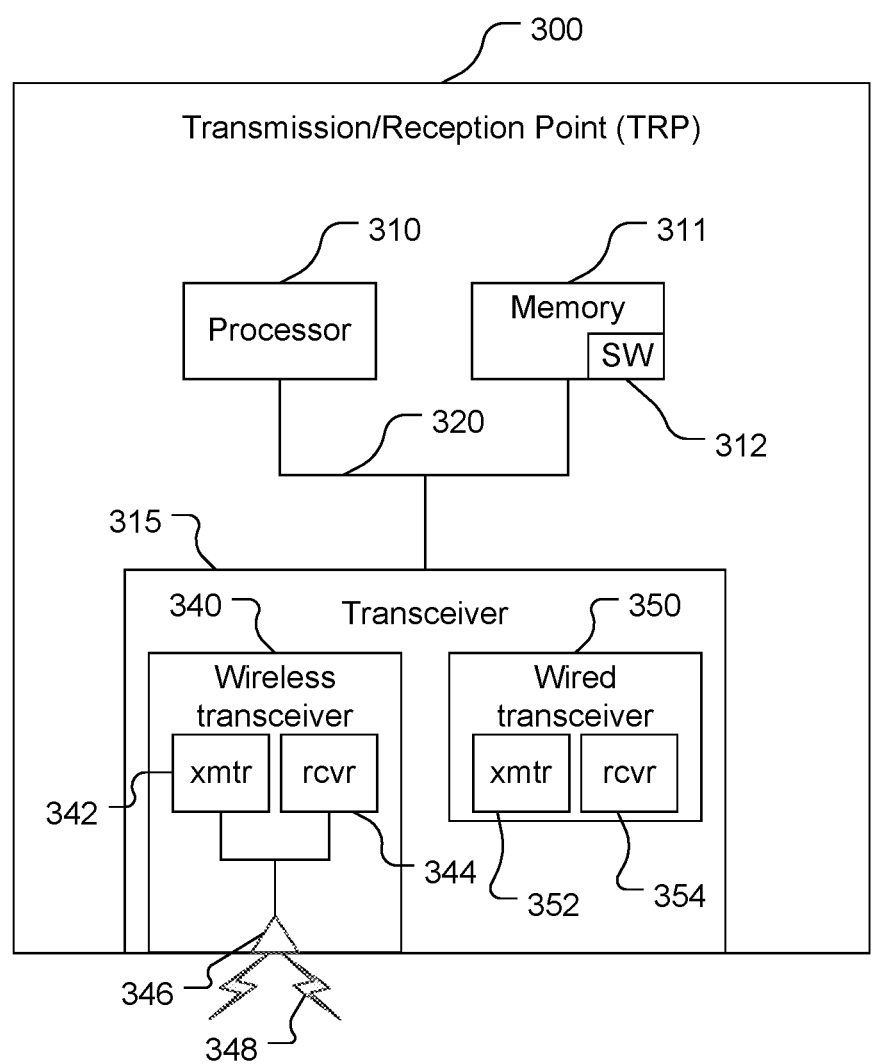
FIG. 3 is a block diagram of components of an example transmission/reception point shown in FIG. 1.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
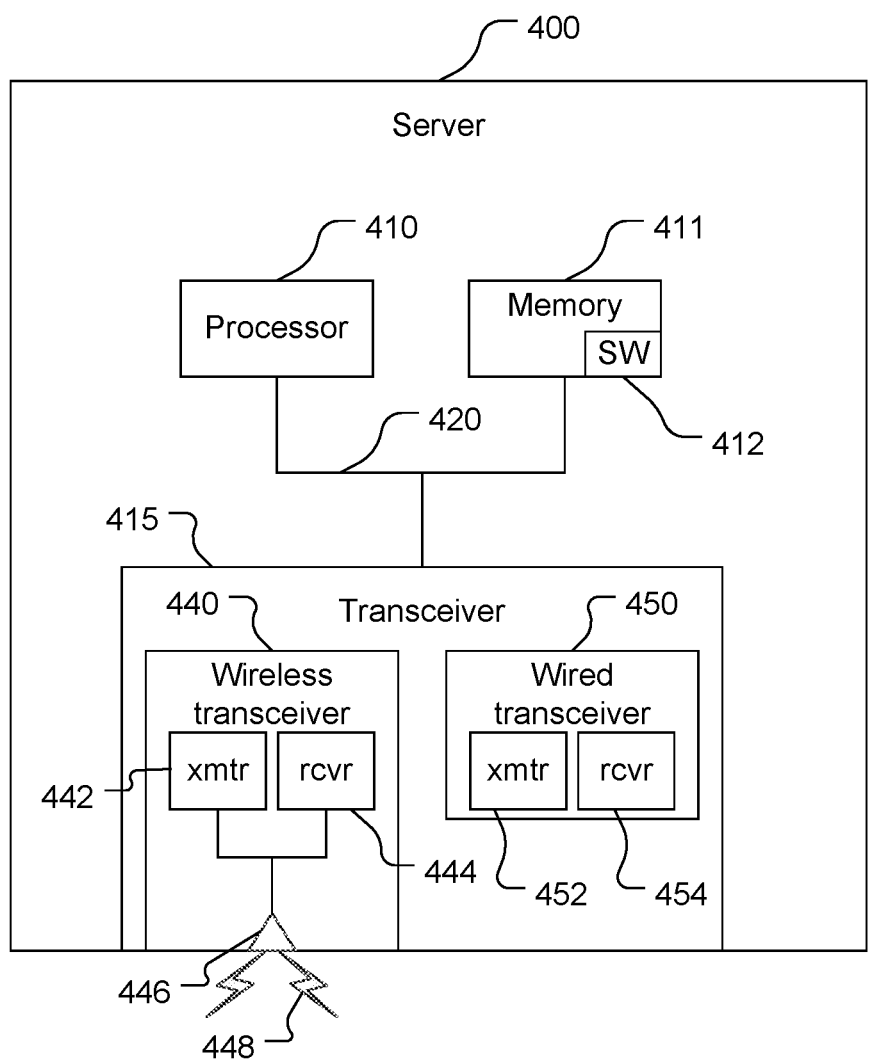
FIG. 4 is a block diagram of components of an example server shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi®, WiFi® Direct (WiFi®-D), Bluetooth®, Zigbee® etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Sensing

Figure 5:
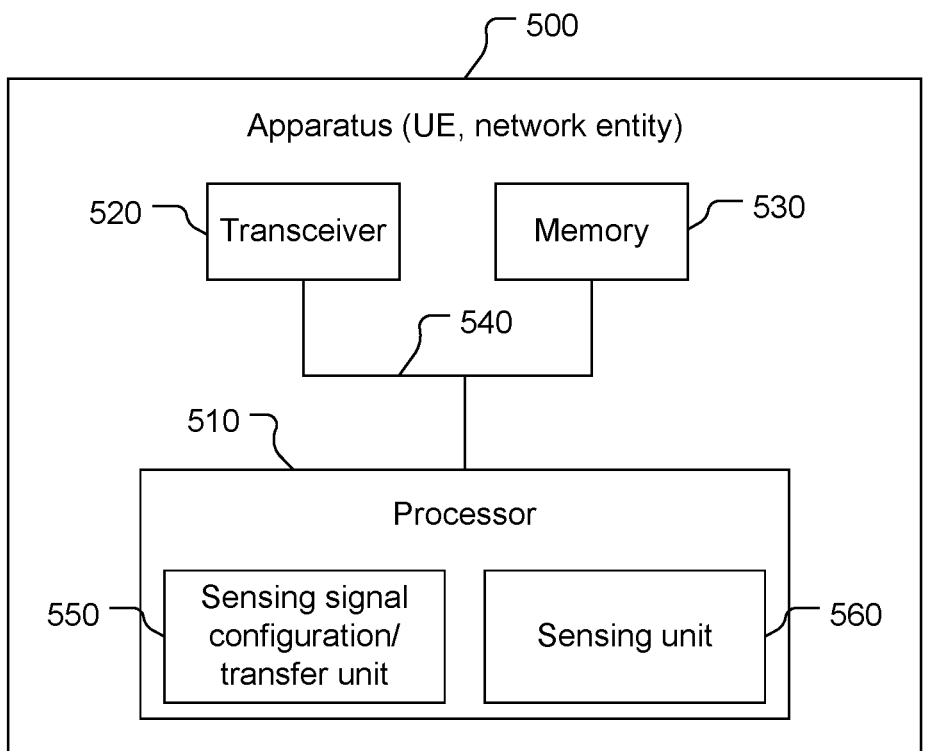
FIG. 5 is a block diagram of an apparatus.

Referring also to FIG. 5, an apparatus 500 includes a processor 510, a transceiver 520, and a memory 530 communicatively coupled to each other by a bus 540. Even if referred to in the singular, the processor 510 may include one or more processors, the transceiver 520 may include one or more transceivers (e.g., one or more transmitters and/or one or more receivers), and the memory 530 may include one or more memories. The apparatus 500 is a network device that may be a UE or a RAN device, e.g., a base station or TRP such as a gNB. The apparatus 500 may include the components shown in FIG. 5. The apparatus 500 may include one or more other components such as any of those shown in FIG. 2 such that the UE 200 may be an example of the apparatus 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer to the processor 510 performing a function, but this includes other implementations such as where the processor 510 executes software (stored in the memory 530) and/or firmware. The description herein may refer to the apparatus 500 performing a function as shorthand for one or more appropriate components (e.g., the processor 510 and the memory 530) of the apparatus 500 performing the function. The processor 510 (possibly in conjunction with the memory 530 and, as appropriate, the transceiver 520) may include a sensing signal configuration/transfer unit 550 and/or a sensing unit 560. The sensing signal configuration/transfer unit 550 may be configured to request a sensing signal configuration, e.g., from another device or from another portion of the apparatus 500. The sensing signal configuration/transfer unit 550 may be configured to determine a configuration of a sensing signal (e.g., in response to a request and/or based on one or more sensing signal performance parameters such as maximum range, range resolution, maximum velocity, and/or velocity resolution). The sensing signal configuration/transfer unit 550 may obtain a sensing signal configuration by retrieving the configuration from memory, e.g., in response to a request and/or based on one or more sensing signal performance parameters. The sensing signal configuration/transfer unit 550 may be configured to transmit a sensing signal configuration to an appropriate destination, e.g., a device that requested a sensing signal configuration, a device that may receive a sensing signal, and/or a device to transmit a sensing signal. The sensing signal unit 560 may be configured to transmit a sensing signal in accordance with the sensing signal configuration. The sensing signal configuration/transfer unit 550 and the sensing signal unit 560 are discussed further below, and the description may refer to the processor 510 generally, or the apparatus 500 generally, as performing any of the functions of the sensing signal configuration/transfer unit 550 or the sensing signal unit 560, with the apparatus 500 being configured to perform the function(s).

Figure 6:
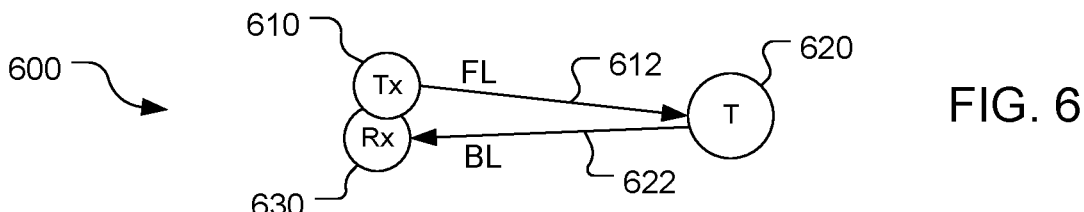
FIG. 6 is a block diagram of a monostatic sensing system.
Figure 7:
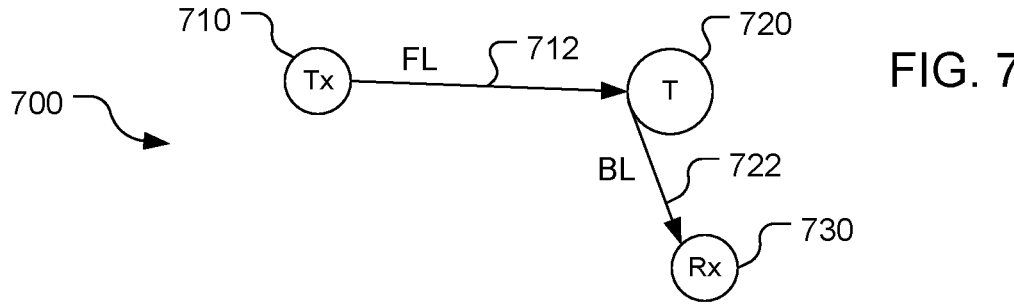
FIG. 7 is a block diagram of a bistatic sensing system.

Referring also to FIGS. 6 and 7, various configurations of sensing systems, such as monostatic sensing systems or bistatic sensing systems, may be implemented. For example, as shown in FIG. 6, a monostatic sensing system 600 includes a transmit node 610, a target object 620, and a receive node 630. In this case, the transmit node 610 and the receive node 630 are co-located and may be portions of a single physical device. The transmit node 610 may transmit an FL signal 812 (forward link signal), and the target object

620 may backscatter (e.g., reflect) a BL signal 622 (backscatter link signal) based on the incoming signal, i.e., the FL signal 612. The receive node 630 may receive and measure the BL signal 622. A transmit (Tx) node or a receive (Rx) node may be, for example, a UE, a TRP, or a RAN node. As shown in FIG. 7, a bistatic sensing system 700 includes a transmit node 710, a target object 720, and a receive node 730. In this case, the transmit node 710 and the receive node 730 are non-co-located. The transmit node 710 may transmit an FL signal 712, the target object 720 may backscatter a BL signal 722 based on the FL signal 712, and the receive node 730 may receive and measure and/or decode the BL signal 722.

Figure 8:
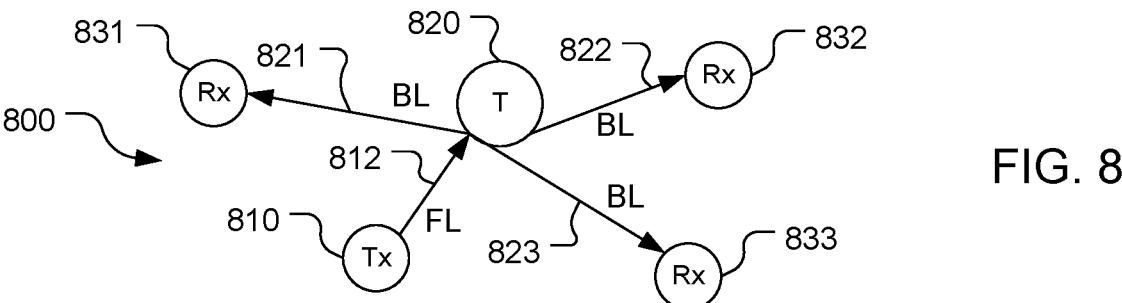
FIG. 8 is a block diagram of a multi-static sensing system.
Figure 9:
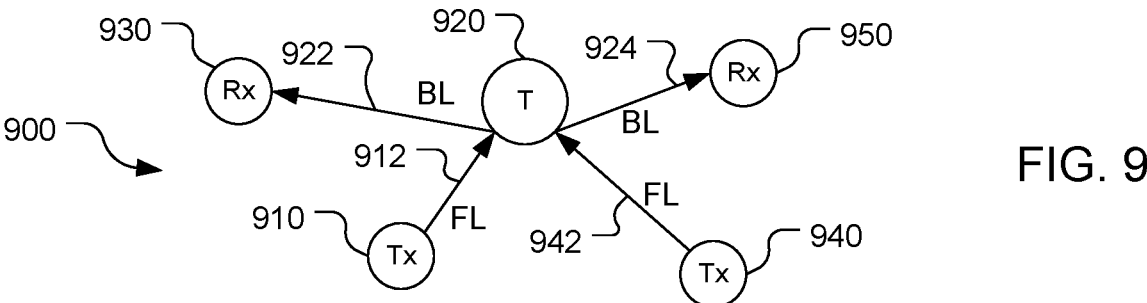
FIG. 9 is a block diagram of another multi-static sensing system.

Referring also to FIGS. 8 and 9, a sensing system may be configured as a multi-static sensing system, in which there are multiple transmit nodes and/or multiple receive nodes. In a multi-static sensing system, there may be one or more monostatic systems and/or one or more bistatic systems. FIGS. 8 and 9 show two examples of bistatic-based multi-static sensing systems. For example, a multi-static sensing system 800 includes a transmit node 810, a target object 820, and receive nodes 831, 832, 833. The transmit node 810 may transmit an FL signal 812, the target object 820 may backscatter BL signals 821, 822, 823 based on the FL signal 812, and the receive nodes 831-833 may receive and measure the BL signals 821-823, respectively. The BL signals 821-823 may be the same signal as transmitted in different directions as shown. As another example, a multi-static sensing system 900 includes transmit nodes 910, 940, a target object 920, and receive nodes 930, 950. The transmit nodes 910, 940 may transmit FL signals 912, 942, respectively, and the target object 920 may transmit BL signals 922, 924. The BL signal 922 may be based on the FL signal 912 alone, or on the FL signal 942 alone, or may be multiple signals with one signal based on the FL signal 912 and another signal based on the FL signal 942. Similarly, the BL signal 924 may be based on the FL signal 912 alone, or on the FL signal 942 alone, or may be multiple signals with one signal based on the FL signal 912 and another signal based on the FL signal 942.

Figure 10:
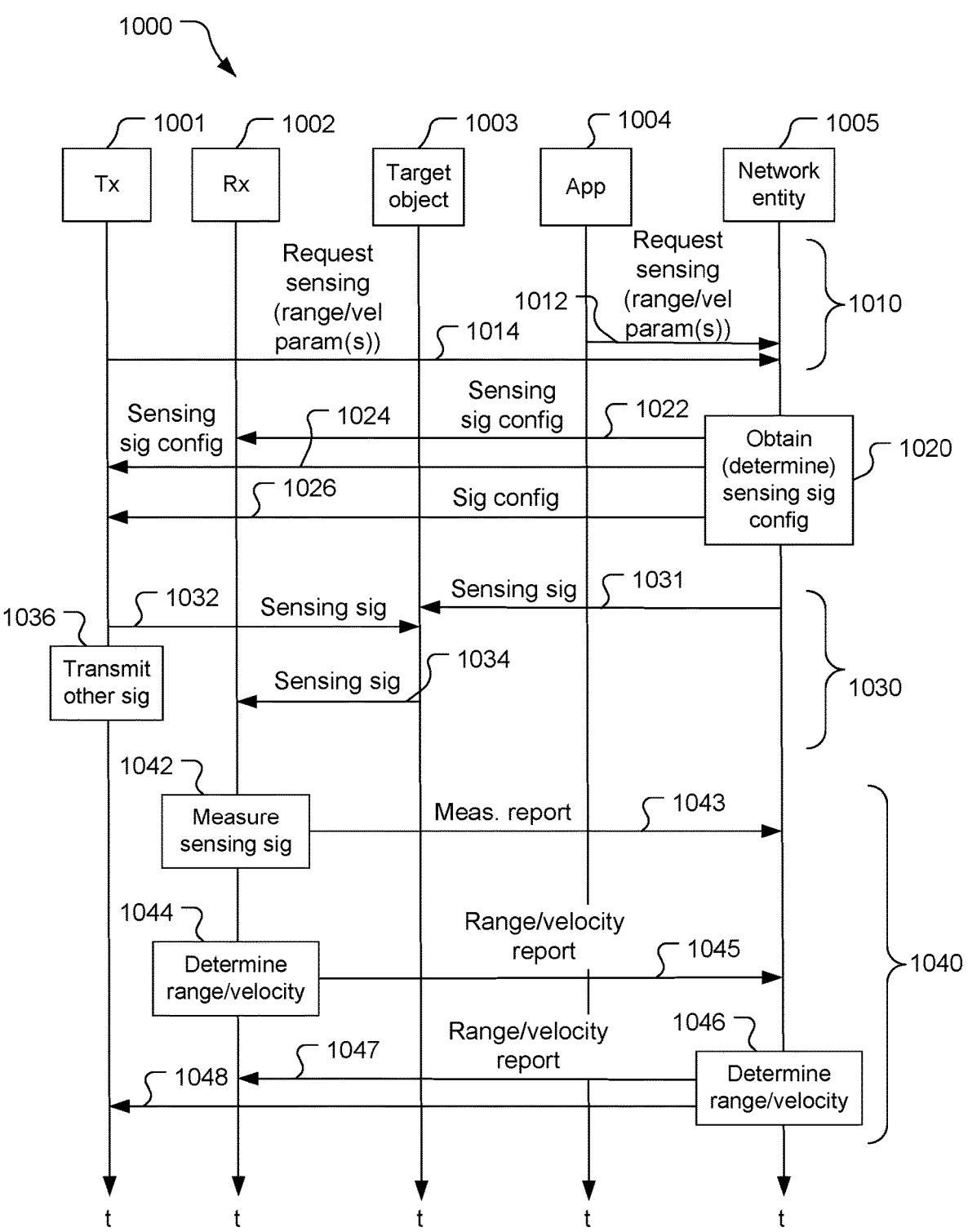
FIG. 10 is a signal and processing flow diagram for determining range to and/or velocity of a target object using radio frequency sensing.

Referring to FIG. 10, with further reference to FIGS. 1-9, a processing and signal flow 1000 for determining range to and/or velocity of a target object using RF sensing includes the stages shown. The flow 1000 is an example of interaction between a transmitter 1001, a receiver 1002, a target object 1003, an application 1004, and a network entity 1005. The transmitter 1001, the receiver 1002, and/or the network entity 1005 may each be an example of the apparatus 500. The network entity 1005 may be an example of the sensing entity 118. The transmitter 1001 and the receiver 1002 may be portions of a single entity or may be separate entities. The application 1004 may be a portion (e.g., of firmware and/or software) of a distinct entity or may be a portion of the transmitter 1001, the receiver 1002, or the network entity 1005. Other flows may be used. For example, one or more stages may be added to the flow 1000, rearranged, and/or removed from the flow 1000. For example, sub-stage 1036 may be omitted. Also, the discussion of the flow 1000 focuses on the requested, provision, and use of a single sensing signal configuration and sensing signal, but the techniques discussed are applicable to multiple sensing signal configurations and multiple sensing signals.

At stage 1010, the network entity 1005 is requested to provide a sensing signal configuration. For example, the application 1004 may transmit a request 1012 to the network entity 1005. The request 1012 may be, for example, from the sensing signal configuration/transfer unit 550 of an entity, and that entity may be physically separate from the network entity 1005. As another example, the request 1012 may be sent from the processor 510 based on a software application (e.g., in the memory 530) requesting location and/or velocity of a target object. As another example, the transmitter 1001 may transmit a request 1014 for a sensing signal configuration to the network entity 1005. Either or both of the requests 1012, 1014 may include information that the network entity 1005 may use to determine a sensing signal configuration. For example, the request 1012 may include one or more sensing performance parameters, e.g., maximum range (to a target object), range resolution, maximum velocity (of a target object), and/or velocity resolution.

At stage 1020, the network entity 1005, e.g., the sensing signal configuration/transfer unit 550 may obtain a sensing signal configuration in response to the request 1012 and/or in response to the request 1014. For example, the network entity 1005, e.g., the sensing signal configuration/transfer unit 550, may be configured to use the sensing performance parameter(s) to determine one or more sensing signal characteristics (e.g., as discussed further below). The network entity 1005 may determine the sensing signal characteristic(s) such that a corresponding sensing signal may be used to determine range and/or velocity information meeting one or more of the performance parameter(s). As another example, the network entity 1005 may be configured to use the sensing performance parameter(s) to determine a stored sensing signal configuration (e.g., to select one of multiple stored configurations) to meet one or more of the performance parameter(s). The network entity 1005, e.g., the sensing signal configuration/transfer unit 550, may provide a determined sensing signal configuration in response to the request 1012 and/or the request 1014. For example, the network entity 1005 may transmit a sensing signal configuration message 1022 to the transmitter 1001 and a sensing signal configuration message 1024 to the receiver 1002. The messages 1022, 1024 may be, for example, a single broadcast or multicast message. The messages 1022, 1024 may be the same message (e.g., broadcast, multicast, or unicast) if the transmitter 1001 and the receiver 1002 are parts of a single physical entity. Optionally, the network entity 1005 may transmit a signal configuration message 1026 to the transmitter 1001 with configuration information for one or more other signals to be transmitted concurrently with one or more constant-frequency segments of a multi-segment sensing signal.

Figure 11:
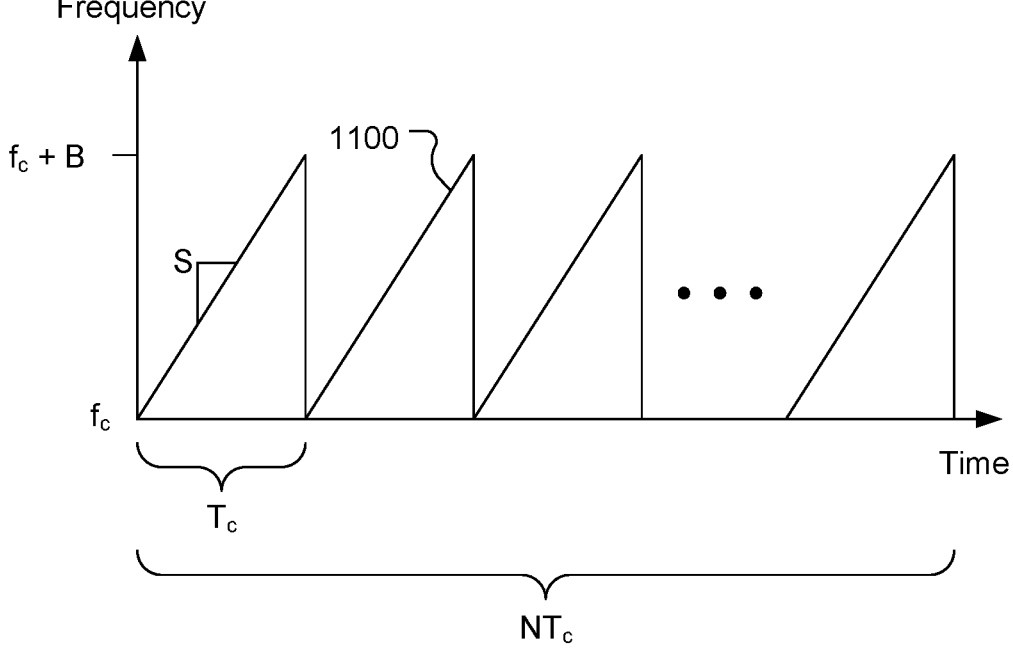
FIG. 11 is a timing diagram of a prior art sensing signal waveform.

Referring also to FIG. 11, previous radar systems have often used an FMCW (Frequency Modulated Continuous Wave) signal (often simply referred to as an FMCW) due to the low complexity and low cost of such signals. The FMCW may be reused for multiple purposes, e.g., sensing, positioning, communications, JCS, etc. An FMCW 1100 frequency ramp may be repeated N times, with each ramp having a duration of $T_c$, a frequency range of B (from a frequency $f_c$ to a frequency of $f_c$+B), a corresponding slope S, and total duration of $NT_c$ based on N repetitions of the frequency ramp. Doppler and range estimations based on FMCWs are dependent upon parameters of the FMCW, with a maximum range R, a range resolution $\Delta R$, a maximum velocity |v|, and a velocity resolution $\Delta v$ that can be determined using the FMCW 1100 given by $$R \leq \frac{F_S c}{4S} \tag{1}$$

-continued $$\Delta R \geq \frac{c}{2B} \tag{2}$$

$$|v| \leq \frac{\lambda}{4T_c} \tag{3}$$

$$\Delta v \geq \frac{\lambda}{2NT_c} \tag{4}$$

where c is the speed of light, $F_S$ is a sampling rate of an analog-to-digital converter (ADC), and $\lambda$ is the wavelength in free space at the low-send frequency ($f_c$) of the bandwidth (B). As can be seen from these relationships, for better range resolution, a larger bandwidth (frequency domain resource) may be used, and for better velocity resolution, a larger time duration (time-domain resource) of multiple FMCWs may be used. Bandwidths of 100 MHz or more, e.g., 1 GHz, 5 GHz, 10 GHz, or other, may be used to provide a desired range resolution. In some use cases, the transmission of an FMCW will occupy an entire bandwidth for a few OFDM (Orthogonal Frequency Division Multiplexing) symbols or slots for sensing purposes. During this time, signal transfer for communication may be prohibited (e.g., to avoid collisions), which may reduce spectrum efficiency.

Figures 12, 13, 14, 15:
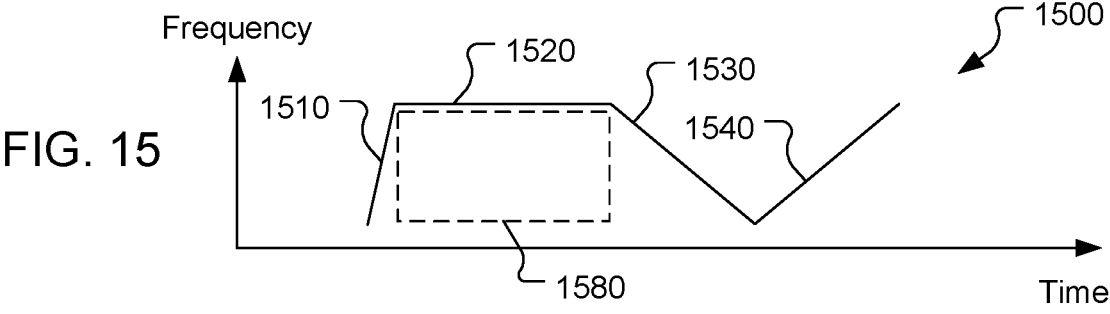
FIG. 12 is a timing diagram of a sensing signal waveform.
FIG. 13 is a timing diagram of another sensing signal waveform.
FIG. 14 is a timing diagram of another sensing signal waveform.
FIG. 15 is a timing diagram of another sensing signal waveform.
Figure 16:
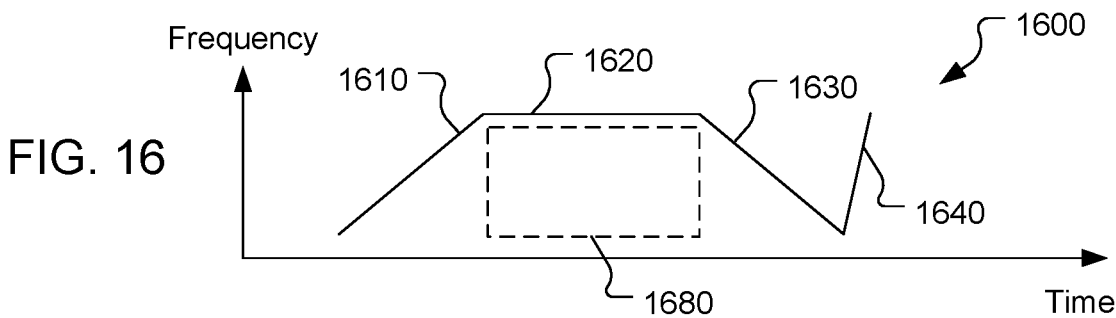
FIG. 16 is a timing diagram of another sensing signal waveform.
Figure 17:
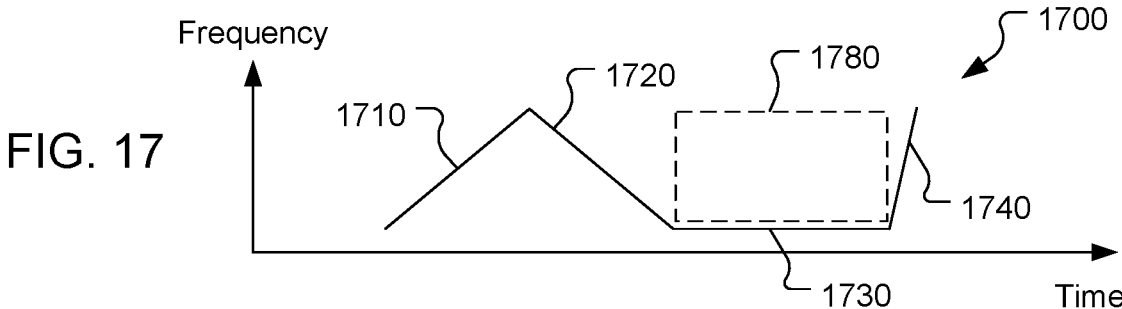
FIG. 17 is a timing diagram of another sensing signal waveform.
Figure 18:
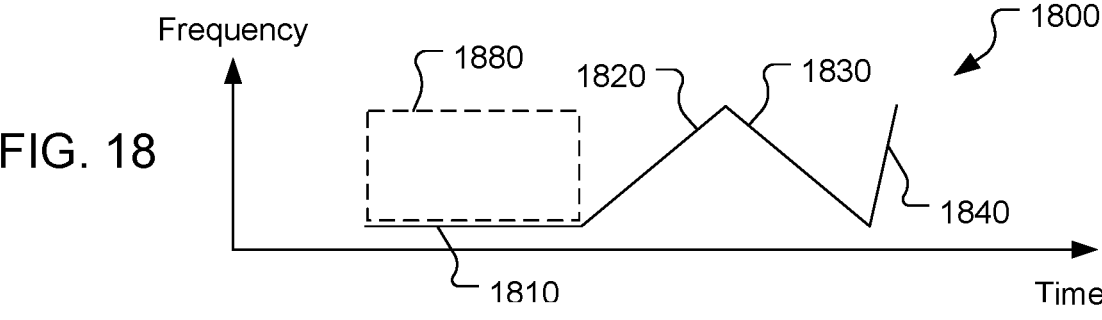
FIG. 18 is a timing diagram of another sensing signal waveform.
Figure 19:
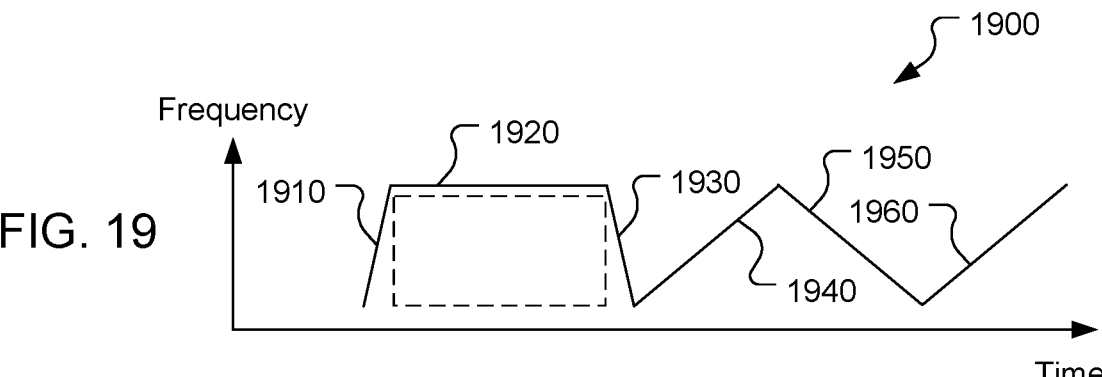
FIG. 19 is a timing diagram of another sensing signal waveform.

Referring also to FIG. 12, the apparatus 500, e.g., the sensing signal configuration/transfer unit 550 and the sensing unit 560, may be configured to obtain (e.g., determine) and/or transfer a sensing signal configuration for a multi-segment sensing signal and/or transmit and/or receive the multi-segment sensing signal. A multi-segment sensing signal may have two or more FMCW segments each with one or more characteristics different from one or more characteristics of the other segment(s) of the multi-segment sensing signal. For example, a multi-segment sensing signal 1200 comprises a fast down-ramp segment 1210 (also called a fast downchirp), a slow up-ramp segment 1220 (also called a slow upchirp), and a slow down-ramp segment 1230 (also called a slow downchirp). The fast down-ramp segment 1210 may span a bandwidth 1240 and a duration 1250. The slow up-ramp segment 1220 and the slow down-ramp segment 1230 may both span the bandwidth 1240 (or may span different bandwidths), and may both span a duration 1260 (or may span different durations). The segments 1220, 1230 may be configured to enable the signal to be transmitted and measured to determine velocity of the target object 1003 with one or more desired performance metrics (e.g., maximum velocity and/or velocity resolution). A slope of any of the segments 1210, 1220, 1230 may be determined as $$S = \frac{B_c}{T_c} \tag{5}$$

where $B_c$ and $T_c$ are the bandwidth 1240 and time duration 1250, 1260 of the respective segment 1210, 1220, 1230. The time duration 1250 is shorter than the time duration 1260.

Consecutive segments of a multi-segment sensing signal (of two segments, four segments, or other quantity of segments) may have frequency continuity. A frequency at which one segment ends (an end frequency of a segment) may be the same frequency at which the next segment in the same multi-segment sensing signal begins (a beginning frequency of a segment). A frequency gap may, however, exist between consecutive segments of a multi-segment sensing signal. The frequency gap between segments may be small enough not to require a retuning of a transmitter between transmitting the end frequency of one segment and the beginning frequency of the next segment, or may be large enough to require transmitter retuning.

The range and velocity of the target object 1003 may be determined from a multi-segment signal with at least one fast chirp (fast upchirp or fast downchirp), at least one slow upchirp, and at least one slow downchirp. The range and velocity may be determined based on a single instance of the multi-segment sensing signal, without repetition of the multi-segment signal.

The range to the target object 1003 may be determined based on measurement of a fast chirp (upchirp or downchirp) of a multi-segment sensing signal. The beat frequency of a fast upchirp may be given by $$f_{up,fast} = S \cdot \frac{2R_m}{c} = S \cdot \frac{2R}{c} - f_d \qquad (6)$$

where $R_m$ is a measured range to the target object 1003, R is an actual range to the target object 1003, c is the speed of light, S is the slope of the ramp, and $f_d$ is a Doppler frequency of a measured fast chirp. The measured range $R_m$ may be determined from a time of flight of the fast chirp signal, and, for bi-static or multi-static sensing, locations of the transmitter(s) and receiver(s). From Equation (6), the actual range R may be given by $$R = R_m + f_d \cdot \frac{c}{2S} \qquad (7)$$

Similarly, the beat frequency of a fast downchirp may be given by $$f_{down,fast} = S \cdot \frac{2R_m}{c} = S \cdot \frac{2R}{c} + f_d \qquad (8)$$

Consequently, the actual range R may be given by $$R = R_m - f_d \cdot \frac{c}{2S} \qquad (9)$$

The design of the fast chirp is such that the slope S is large, the Doppler frequency term $$f_d \cdot \frac{c}{2S}$$

may be ignored such that $$R \approx R_m \qquad (10)$$

For example, if velocity is 72 km/h, the duration of the chirp ($T_c$) is 0.1 ms, the bandwidth $B_c$ is 150 MHz, and the low-end frequency ($f_c$) of the chirp is 24 GHz, then $$f_d \cdot \frac{c}{2S} = f_c \cdot \frac{2v}{c} \cdot \frac{cT_c}{2B_c} = \frac{f_c v T_c}{B_c} = 0.32m \qquad (11)$$

The velocity of the target object 1003 may be determined from beat frequencies determined from measurements of the slow upchirp and slow downchirp of a multi-segment sensing signal. The beat frequency of an upchirp may be determined according to $$f_{up,slow} = S' \cdot \frac{2R_m}{c} = S' \cdot \frac{2R}{c} - f_c \cdot \frac{2v}{c} \qquad (12)$$

where v is the velocity of the target object 1003, $f_c$ is low-end frequency of the slow ramp, and S' is the slope of the slow chirp. The beat frequency of a downchirp may be determined according to $$f_{down,slow} = S' \cdot \frac{2R_m}{c} = S' \cdot \frac{2R}{c} - f_c \cdot \frac{2v}{c} \qquad (13)$$

From Equations (6) and (7), and solving for the velocity v (which removes the range term R), the velocity is given by $$v = \frac{(f_{down,slow} - f_{up,slow}) \cdot c}{4f_c} \qquad (14)$$

The beat frequencies may be measured directly, and the velocity determined using Equation (14).

Determining range and velocity in this manner provides accurate range and velocity values for a single target object in a sensing area (an area covered by the sensing signal, such that the sensing signal reflects off the target object and is received by a receiver with adequate signal strength for measurement). If multiple (e.g., N) target objects are present in the sensing area, then there may be difficulty determining the respective pair of beat frequencies corresponding to each target object as there may be 2N beat frequencies detected. Each N upchirp beat frequencies and each N downchirp beat frequencies may be matched into a pair, which may result in $N^2$ pairs for $N^2$ candidate target objects. Of the $N^2$ candidate target objects, however, only N target objects are real (actual) objects and the remaining $N^2$-N candidate objects are not real (actual) objects at all and are called ghost objects. It has been found that using a multi-segment signal with a constant-frequency segment (a continuous wave (CW) segment) may be used to avoid considering ghost objects as real objects.

Referring also to FIGS. 13-19, multi-segment sensing signals may comprise at least four different segments of three different segment types (fast chirp, slow chirp, constant frequency). Each such multi-segment sensing signal comprises at least one fast chirp (fast upchirp or fast downchirp), at least one slow upchirp, at least one slow downchirp, and at least one constant-frequency segment. Such multi-segment sensing signals may be used to uniquely identify the range and velocity for multiple actual target objects, avoiding ghost objects being considered to be actual objects. The signals shown in FIGS. 13-19 are examples and numerous other patterns and/or combinations of segment types may be used (e.g., with a single multi-segment sensing signal comprising multiple segments of one or more of the same segment type). The signals shown in FIGS. 13-19 include a monotonically-increasing slow chirp (here, linearly increasing frequency as a function of time), a monotonically-decreasing slow chirp (here, linearly decreasing frequency as a function of time), a monotonically-changing fast chirp (here, linearly increasing frequency as a function of time or linearly decreasing frequency as a function of time), and a constant-frequency segment. The signal shown in FIG. 19 includes multiple slow upchirps and multiple fast chirps (one fast upchirp and one fast downchirp). A multi-segment sensing signal 1300 includes a fast upchirp 1310, followed by a slow downchirp 1320, followed by a constant-frequency segment 1330, followed by a slow upchirp 1340. A multi-segment sensing signal 1400 includes a fast upchirp 1410, followed by a slow downchirp 1420, followed by a slow upchirp 1430, followed by a constant-frequency segment 1440. A multi-segment sensing signal 1500 includes a fast upchirp 1510, followed by a constant-frequency segment 1520, followed by a slow downchirp 1530, followed by a slow upchirp 1540. A multi-segment sensing signal 1600 includes a slow upchirp 1610, followed by a constant-frequency segment 1620, followed by a slow downchirp 1630, followed by a fast upchirp 1640. A multi-segment sensing signal 1700 includes a slow upchirp 1710, followed by a slow downchirp 1720, followed by a constant-frequency segment 1730, followed by a fast upchirp 1740. A multi-segment sensing signal 1800 includes a constant-frequency segment 1810, followed by a slow upchirp 1820, followed by a slow downchirp 1830, followed by a fast upchirp 1840. A multi-segment sensing signal 1900 includes a fast upchirp 1910, followed by a constant-frequency segment 1920, followed by a fast downchirp 1930, followed by a slow upchirp 1940, followed by another slow downchirp 1950, followed by another slow upchirp 1960. Numerous other patterns of multi-segment sensing signals may be used.

The network entity 1005 may determine the sensing signal characteristic(s) such that a corresponding sensing signal may be used to determine range and/or velocity information meeting one or more of the maximum range, range resolution, maximum velocity, and/or velocity resolution according to relationships (1)-(4). For example, relationship (1) may be used to determine a slope of a slow chirp to meet a desired maximum range. As another example, relationship (2) may be used to determine a bandwidth of a multi-segment sensing signal to meet a desired range resolution. As another example, relationship (3) may be used to determine a duration of a slow chirp to meet a desired maximum detectable velocity. As another example, relationship (4) may be used to determine an overall duration of a multi-segment sensing signal (represented by $NT_c$) to meet a desired velocity resolution. The network entity 1005 may determine individual segment durations in combination with total sensing signal duration to meet both desired maximum detectable velocity and desired velocity resolution.

The velocity of and range to the target object 1003 may be determined by a multi-segment signal with at least one slow upchirp, at least one slow downchirp, at least one fast upchirp, and at least one constant-frequency segment in one shot, without repetition of the multi-segment signal. For example, the apparatus 500, e.g., the sensing unit 560, may use beat frequencies of slow chirps and a constant-frequency segment to determine candidate objects and use determined ranges to narrow the candidate objects to real objects. The beat frequency of a constant-frequency segment is provided by $$f_{CW,beat} = f_{CW} \cdot \frac{2v}{c} \qquad (15)$$

where $f_{CW}$ is the frequency of the constant-frequency segment and $2v/c$ is a Doppler frequency component. From Equation (15), the velocity v of the target object 1003 may be determined as $$v = \frac{f_{CW,beat} \cdot c}{f_{CW} \cdot 2} \qquad (16)$$

From Equation (12), based on a slow upchirp, the velocity of the target object 1003 may be determined as $$v = S' \cdot \frac{R}{f_c} - f_{up,slow} \cdot \frac{c}{2f_c} \qquad (17)$$

From Equation (13), based on a slow downchirp, the velocity of the target object 1003 may be determined as $$v = f_{down,slow} \cdot \frac{c}{2f_c} - S' \cdot \frac{R}{f_c} \qquad (18)$$

Figure 20:
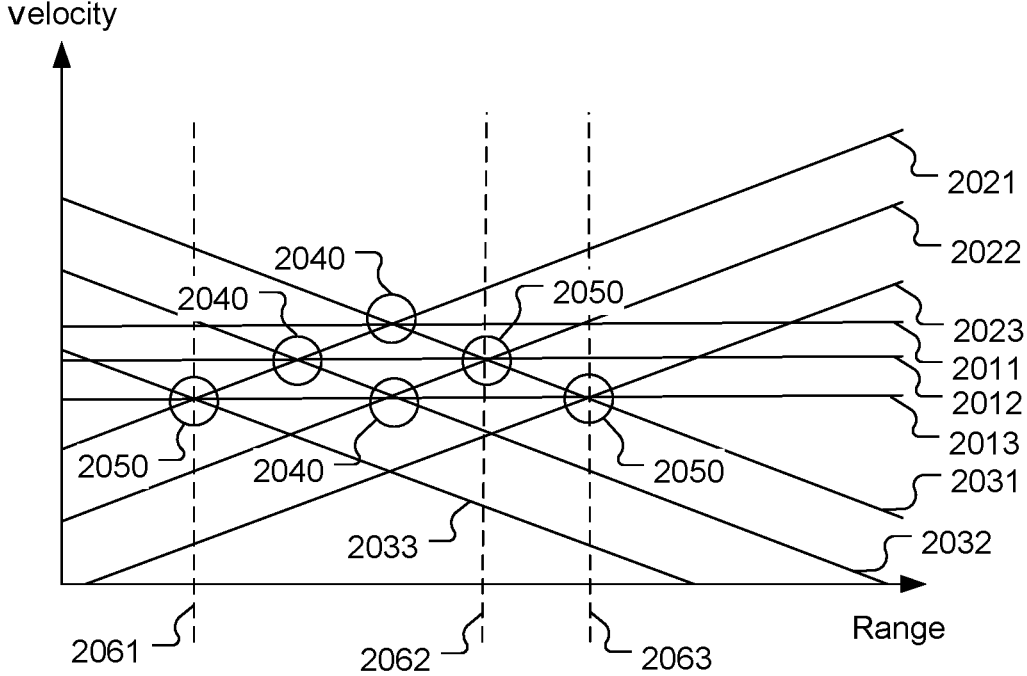
FIG. 20 a graph of velocity and range plots in a range-velocity domain.

Referring also to FIG. 20, Equations (16)-(18) may be used in combination, along with ranges determined from fast chirp measurements, to uniquely identify velocities and ranges of multiple target objects in a sensing area. Each of Equations (16)-(18) is a function of velocity and range and thus may be plotted in a range-velocity domain and used, e.g., by the sensing unit 560, to determine intersection points of Equations (16)-(18) in the range velocity domain. For example, Equation (16) may be represented by plots 2011, 2012, 2013 in the range-velocity domain, with each of the plots 2011, 2012, 2013 corresponding to a different measured beat frequency from a different target object. Similarly, Equation (17) may be represented by plots 2021, 2022, 2023 in the range-velocity domain. Similarly, Equation (18) may be represented by plots 2031, 2032, 2033 in the range-velocity domain. Intersections of the plots 2011-2013, 2021-2023, 2031-2033 yield multiple candidate objects 2040 that are ghost objects and multiple candidate objects 2050 that are real objects. By using measured range values 2061, 2062, 2063 ($R_m$) based on fast chirps, the intersection points of the plots 2011-2013, 2021-2023, 2031-2033 may be narrowed to the candidate objects 2050 that are real objects. The three candidate objects 2040 and the three candidate objects 2050 are an example, and other examples may have other quantities of ghost objects and/or real objects. In this example, upchirps and downchirps would have three reflections from three target objects and thus the sensing unit 560 could determine that there are three actual objects in the sensing area.

At least a portion of a duration of a constant-frequency segment of a multi-segment sensing signal may be used for transmission of one or more communication signals. A constant-frequency segment of a multi-segment sensing signal may be frequency division multiplexed (FDMed) with one or more other signals. A constant-frequency segment of a multi-segment sensing signal may occupy a single resource element of an OFDM resource element (RE). Frequencies other than the frequency (e.g., the RE) used for the constant-frequency segment that are within the bandwidth of the multi-segment sensing signal may be used, e.g., for another purpose such as communication. For example, communication resources 1380, 1480, 1580, 1680, 1780, 1880, 1980 may be transmitted during respective constant-frequency segments 1330, 1440, 1520, 1620, 1730, 1810, 1920. The communication resources 1380, 1480, 1580, 1680, 1780, 1880, 1980 occupy the frequencies of the bandwidth of the respective multi-segment sensing signals 1300, 1400, 1500, 1600, 1700, 1800, 1900 and span durations corresponding to the respective constant-frequency segments 1330, 1440, 1520, 1620, 1730, 1810, 1920. These are examples, and a resource, e.g., a communication resource, transmitted concurrently with a constant-frequency segment of a multi-segment sensing signal may not use an entire unused portion of the bandwidth of the multi-segment sensing signal and/or may span a duration less than the duration of the constant-frequency segment. Transmitting the constant-frequency segment of a multi-segment sensing signal concurrently with another signal (e.g., a communication signal) may provide higher spectrum efficiency than legacy radar waveforms while maintaining benefits of legacy radar waveforms. Using a combination of FMCW (fast chirp(s) and slow chirps) segments and one or more CW (constant-frequency) segments may greatly enhance cellular system spectrum efficiency compared to legacy sensing systems in which FMCW waveforms are repeated, with each repetition occupying an entire bandwidth of the sensing signal.

Referring again in particular to FIG. 10, at stage 1030, the transmitter 1001 transmits a multi-segment sensing signal 1032 and the receiver 1002 receives a reflected multi-segment sensing signal 1034. The transmitter 1001, e.g., the sensing unit 560, transmits the multi-segment sensing signal 1032 in accordance with the sensing signal configuration in the sensing signal configuration message 1024 received from the network entity 1005. The receiver 1002 receives the reflected multi-segment sensing signal 1034 reflected off the target object 1003. Also or alternatively, the network entity 1005, e.g., the sensing unit 560, may transmit a multi-segment sensing signal 1031 in accordance with the multi-segment sensing signal configuration determined at stage 1020 and the sensing signal 1034 may include a reflection of the sensing signal 1031. At optional sub-stage 1036, the transmitter 1001 may transmit one or more signals (e.g., one or more communication signals) concurrently with at least one constant-frequency segment of the multi-segment sensing signal 1032 in accordance with signal configuration information received in the signal configuration message 1026. For a multi-static sensing system with multiple transmitters, different transmitters may transmit sensing signals with different configurations.

At stage 1040, the reflected multi-segment sensing signal is measured and velocity and/or range to one or more target objects is/are determined. At sub-stage 1042, the receiver 1002, e.g., the sensing unit 560, uses the sensing signal configuration received in the sensing signal configuration message 1022 to measure the reflected multi-segment sensing signal 1034. The receiver 1002 may measure different segments of the reflected multi-segment sensing signal 1034 to determine one or more corresponding values. The receiver 1002 may transmit one or more of the determined value(s) to the network entity 1005 in a measurement report 1043. At sub-stage 1044, the receiver 1002, e.g., the sensing unit 560, may use determined values from the measurement of the signal 1034 to determine the range to the target object 1003 and/or the velocity of the target object 1003, e.g., using Equation (14) and/or using Equations (16)-(18) as discussed above. Similarly, the range(s) to and/or the velocity(ies) of one or more other target objects present in a sensing area of the transmitter 1001 and the receiver 1002, or one or more transmitters and/or one or more receivers, may be determined. The receiver 1002 may transmit the determined range(s) and/or the determined velocity(ies) to the network entity 1005 in a range/velocity report 1045. Also or alternatively, at sub-stage 1046, the network entity 1005 may determine one or more target object ranges and/or one or more target object velocities similar to sub-stage 1044, e.g., based on information in the measurement report 1043. The network entity 1005 may transmit one or more determined ranges and/or one or more determined velocities to another entity, e.g., to the receiver 1002 in a range/velocity report 1047 and/or to the transmitter 1001 in a range/velocity report 1048.

Referring to FIG. 21, with further reference to FIGS. 1-20, a radio frequency sensing method 2100 includes the stages shown. The method 2100 is, however, an example only and not limiting. The method 2100 may be altered, e.g., by having one or more stages added, removed, rearranged, combined, performed concurrently, and/or having one or more single stages split into multiple stages. The radio frequency method 2100 comprises at least a portion of a method for determining range and/or velocity of each of one or more target objects using RF sensing.

At stage 2110, the method 2100 includes obtaining, at an apparatus, a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time. For example, at stage 1020, the network entity 1005 may determine configuration parameters for a multi-segment sensing signal (e.g., time duration and bandwidth for fast and slow chirps) and/or may retrieve configuration parameters for a multi-segment sensing signal from memory. The processor 510, possibly in combination with the memory 530, may comprise means for obtaining the sensing signal configuration. Also or alternatively, the transmitter 1001 and the receiver 1002 may obtain a multi-segment sensing signal configuration from the network entity 1005 in the messages 1024, 1022, respectively. The processor 510, possibly in combination with the memory 530, possibly in combination with the transceiver 520 (e.g., the wireless receiver 244 and the antenna 246) may comprise means for obtaining the sensing signal configuration.

At stage 2120, the method 2100 includes transmitting the sensing signal configuration from the apparatus, or transmitting the sensing signal from the apparatus, or transmitting the sensing signal configuration and the sensing signal from the apparatus, or receiving and measuring the sensing signal at the apparatus, or any combination of two or more thereof. For example, the network entity 1005, e.g., the sensing signal configuration/transfer unit 550, may transmit one or more of the sensing signal configuration messages 1022, 1024. The processor 510, possibly in combination with the memory 530, possibly in combination with the transceiver 520 (e.g., the wireless transmitter 442 and the antenna 446, and/or the wired transmitter 452) may comprise means for transmitting the sensing signal configuration. As another example, the network entity 1005 may transmit the sensing signal 1031 and/or the transmitter 1001 may transmit the sensing signal 1032. The processor 510, possibly in combination with the memory 530, possibly in combination with the transceiver 520 (e.g., the wireless transmitter 442 and the antenna 446, or the wireless transmitter 242 and the antenna 246, or the wireless receiver 344 and the antenna 346) may comprise means for transmitting the sensing signal. As another example, the network entity 1005 may transmit one or more of the sensing signal configuration messages 1022, 1024 and the sensing signal 1031. The processor 510, possibly in combination with the memory 530, possibly in combination with the transceiver 520 (e.g., the wireless transmitter 442 and the antenna 446, and possibly the wired transmitter 452) may comprise means for transmitting the sensing signal configuration and the sensing signal. As another example, the receiver 1002, e.g., the sensing unit 560, may receive and measure the reflected multi-segment sensing signal 1034. The processor 510, possibly in combination with the memory 530, possibly in combination with the transceiver 520 (e.g., the wireless receiver 244 and the antenna 246, or the wireless receiver 344 and the antenna 346, or the wireless receiver 444 and the antenna 446) may comprise means for receiving and measuring the sensing signal.

Implementations of the method 2100 may include one or more of the following features. In an example implementation, the sensing signal configuration indicates a fourth segment of the sensing signal with a constant frequency over a fourth length of time. For example, the sensing signal configuration may include characteristics of a CW segment (e.g., frequency and duration). In a further example implementation, the method 2100 includes determining a velocity of a target object based on a first beat frequency based on a first measurement of the first segment of the sensing signal, a second beat frequency based on a second measurement of the second segment of the sensing signal, a third beat frequency based on a third measurement of the fourth segment of the sensing signal, and a range from a source of the sensing signal to the target object based on a fourth measurement of the third segment of the sensing signal. For example, the network entity 1005 may determine velocity of the target object 1003 using Equations (16)-(18) and a determined range from a fast chirp, and may do so for multiple target objects. The processor 510, possibly in combination with the memory 530, possibly in combination with the transceiver 520 (e.g., the wireless receiver 444 and the antenna 446, or the wired receiver 454) may comprise means for determining the velocity of the target object. In another further example implementation, the method 2100 includes transmitting the sensing signal, and the method 2100 further includes: obtaining, at the apparatus, a communication signal configuration that indicates a communication signal for transmission during at least a portion of the fourth length of time; and transmitting, from the apparatus in accordance with the communication signal configuration, the communication signal during the at least a portion of the fourth length of time. For example, at stage 1020, the transmitter 1001 may receive signal configuration information for a communication signal in the signal configuration message 1026. At sub-stage 1036, the transmitter 1001 may transmit the communication in accordance with the signal configuration concurrently with at least a portion of a constant-frequency segment of the sensing signal 1032. The processor 510, possibly in combination with the memory 530, in combination with the transceiver 520 (e.g., the wireless receiver 244 and the antenna 246) may comprise means for obtaining the communication signal configuration. The processor 510, possibly in combination with the memory 530, in combination with the transceiver 520 (e.g., the wireless transmitter 242 and the antenna 246) may comprise means for transmitting the communication signal.

In another further example implementation, the sensing signal configuration indicates that the first length of time, the second length of time, the third length of time, and the fourth length of time are all within a single orthogonal frequency division multiplexed slot. For example, a duration of a multi-segment sensing signal indicated by the sensing signal configuration, e.g., a duration 1350 of the signal 1300, may span less than a single OFDM slot.

Also or alternatively, implementations of the method 2100 may include one or more of the following features. In an example implementation, the sensing signal configuration indicates that the first segment of the sensing signal, the second segment of the sensing signal, and the third segment of the sensing signal each span a same range of frequencies. For example, the sensing signal configuration messages 1022, 1024 may indicate the same bandwidth, e.g., the bandwidth 1240, for a fast chirp and slow chirps. In another example implementation, the sensing signal configuration indicates that the first segment of the sensing signal has a linearly increasing frequency over the first length of time, that the second segment of the sensing signal has a linearly decreasing frequency over the second length of time, and that the third segment of the sensing signal has a linearly changing frequency over the third length of time. For example, the first segment may be a linear slow upchirp, the second segment may be a linear decreasing slow downchirp, and the third segment may be a fast chirp (fast upchirp or fast downchirp). In another example implementation, obtaining the sensing signal configuration comprises determining the sensing signal configuration based on one or more range quality parameters or based on one or more velocity quality parameters or based on a combination of the one or more range quality parameters and the one or more velocity quality parameters. For example, the network entity 1005, e.g., the sensing signal configuration/transfer unit 550, may determine one or more multi-segment sensing signal characteristics (e.g., segment duration, segment bandwidth) based on one or more range and/or velocity parameters (e.g., maximum range, range resolution, maximum velocity, velocity resolution) received in one or more of the requests 1012, 1014. The processor 510, possibly in combination with the memory 530, possibly in combination with the transceiver 520 (e.g., the wireless receiver 444 and the antenna 446, and/or the wired receiver 454) may comprise means for determining the sensing signal configuration. In another example implementation, the sensing signal configuration provides frequency continuity of the sensing signal between consecutive segments of the sensing signal. For example, the sensing signal configuration may indicate that there is no frequency gap between the end frequency of one segment of a multi-segment sensing signal and the beginning frequency of the next segment of the multi-segment sensing signal.

IMPLEMENTATION EXAMPLES

Implementation examples are provided in the following numbered clauses.

Clause 1. An apparatus comprising:
one or more transceivers;
one or more memories; and
one or more processors, communicatively coupled to the one or more transceivers and the one or more memories;
wherein:
the one or more processors are configured to obtain a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and the one or more processors are configured to transmit, via the one or more transceivers, the sensing signal configuration, or the one or more processors are configured to transmit, via the one or more transceivers, the sensing signal, or the one or more processors are configured to transmit, via the one or more transceivers, the sensing signal configuration and the sensing signal, or the one or more processors are configured to receive, via the one or more transceivers, and measure the sensing signal.

Clause 2. The apparatus of clause 1, wherein the sensing signal configuration indicates a fourth segment of the sensing signal with a constant frequency over a fourth length of time.

Clause 3. The apparatus of clause 2, wherein the one or more processors are configured to determine a velocity of a target object based on a first beat frequency based on a first measurement of the first segment of the sensing signal, a second beat frequency based on a second measurement of the second segment of the sensing signal, a third beat frequency based on a third measurement of the fourth segment of the sensing signal, and a range from a source of the sensing signal to the target object based on a fourth measurement of the third segment of the sensing signal.

Clause 4. The apparatus of either clause 2 or clause 3, wherein the one or more processors are configured to transmit the sensing signal and the one or more processors are configured to:

obtain a communication signal configuration that indicates a communication signal for transmission during at least a portion of the fourth length of time; and transmit, via the one or more transceivers and in accordance with the communication signal configuration, the communication signal during the at least a portion of the fourth length of time.

Clause 5. The apparatus of any of clauses clause 2-4, wherein the sensing signal configuration indicates that the first length of time, the second length of time, the third length of time, and the fourth length of time are all within a single orthogonal frequency division multiplexed slot.

Clause 6. The apparatus of any of clauses 1-5, wherein the sensing signal configuration indicates that the first segment of the sensing signal, the second segment of the sensing signal, and the third segment of the sensing signal each span a same range of frequencies.

Clause 7. The apparatus of any of clauses 1-6, wherein the sensing signal configuration indicates that the first segment of the sensing signal has a linearly increasing frequency over the first length of time, that the second segment of the sensing signal has a linearly decreasing frequency over the second length of time, and that the third segment of the sensing signal has a linearly changing frequency over the third length of time.

Clause 8. The apparatus of any of clauses 1-7, wherein the one or more processors are configured to determine the sensing signal configuration based on one or more range quality parameters or based on one or more velocity quality parameters or based on a combination of the one or more range quality parameters and the one or more velocity quality parameters.

Clause 9. The apparatus of any of clauses 1-8, wherein the sensing signal configuration provides frequency continuity of the sensing signal between consecutive segments of the sensing signal.

Clause 10. A radio frequency sensing method comprising:

obtaining, at an apparatus, a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and transmitting the sensing signal configuration from the apparatus, or transmitting the sensing signal from the apparatus, or transmitting the sensing signal configuration and the sensing signal from the apparatus, or receiving and measuring the sensing signal at the apparatus, or any combination of two or more thereof.

Clause 11. The radio frequency sensing method of clause 10, wherein the sensing signal configuration indicates a fourth segment of the sensing signal with a constant frequency over a fourth length of time.

Clause 12. The radio frequency sensing method of clause 11, further comprising determining a velocity of a target object based on a first beat frequency based on a first measurement of the first segment of the sensing signal, a second beat frequency based on a second measurement of the second segment of the sensing signal, a third beat frequency based on a third measurement of the fourth segment of the sensing signal, and a range from a source of the sensing signal to the target object based on a fourth measurement of the third segment of the sensing signal.

Clause 13. The radio frequency sensing method of either clause 11 or clause 12, wherein the radio frequency sensing method comprises transmitting the sensing signal, the radio frequency sensing method further comprising:

obtaining, at the apparatus, a communication signal configuration that indicates a communication signal for transmission during at least a portion of the fourth length of time; and transmitting, from the apparatus in accordance with the communication signal configuration, the communication signal during the at least a portion of the fourth length of time.

Clause 14. The radio frequency sensing method of any of clauses 11-13, wherein the sensing signal configuration indicates that the first length of time, the second length of time, the third length of time, and the fourth length of time are all within a single orthogonal frequency division multiplexed slot.

Clause 15. The radio frequency sensing method of any of clauses 10-14, wherein the sensing signal configuration indicates that the first segment of the sensing signal, the second segment of the sensing signal, and the third segment of the sensing signal each span a same range of frequencies.

Clause 16. The radio frequency sensing method of any of clauses 10-15, wherein the sensing signal configuration indicates that the first segment of the sensing signal has a linearly increasing frequency over the first length of time, that the second segment of the sensing signal has a linearly decreasing frequency over the second length of time, and that the third segment of the sensing signal has a linearly changing frequency over the third length of time.

Clause 17. The radio frequency sensing method of any of clauses 10-16, wherein obtaining the sensing signal configuration comprises determining the sensing signal configuration based on one or more range quality parameters or based on one or more velocity quality parameters or based on a combination of the one or more range quality parameters and the one or more velocity quality parameters.

Clause 18. The radio frequency sensing method of any of clauses 10-17, wherein the sensing signal configuration provides frequency continuity of the sensing signal between consecutive segments of the sensing signal.

Clause 19. An apparatus comprising:
means for obtaining a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and
means for transmitting the sensing signal configuration from the apparatus, or means for transmitting the sensing signal from the apparatus, or means for transmitting the sensing signal configuration and the sensing signal from the apparatus, or means for receiving and measuring the sensing signal at the apparatus, or any combination of two or more thereof.

Clause 20. The apparatus of clause 19, wherein the sensing signal configuration indicates a fourth segment of the sensing signal with a constant frequency over a fourth length of time.

Clause 21. The apparatus of clause 20, further comprising means for determining a velocity of a target object based on a first beat frequency based on a first measurement of the first segment of the sensing signal, a second beat frequency based on a second measurement of the second segment of the sensing signal, a third beat frequency based on a third measurement of the fourth segment of the sensing signal, and a range from a source of the sensing signal to the target object based on a fourth measurement of the third segment of the sensing signal.

Clause 22. The apparatus of either clause 20 or clause 21, wherein the apparatus comprises the means for transmitting the sensing signal, the apparatus further comprising:
means for obtaining a communication signal configuration that indicates a communication signal for transmission during at least a portion of the fourth length of time; and
means for transmitting, in accordance with the communication signal configuration, the communication signal during the at least a portion of the fourth length of time.

Clause 23. The apparatus of any of clauses 20-22, wherein the sensing signal configuration indicates that the first length of time, the second length of time, the third length of time, and the fourth length of time are all within a single orthogonal frequency division multiplexed slot.

Clause 24. The apparatus of any of clauses 19-23, wherein the sensing signal configuration indicates that the first segment of the sensing signal, the second segment of the sensing signal, and the third segment of the sensing signal each span a same range of frequencies.

Clause 25. The apparatus of any of clauses 19-24, wherein the sensing signal configuration indicates that the first segment of the sensing signal has a linearly increasing frequency over the first length of time, that the second segment of the sensing signal has a linearly decreasing frequency over the second length of time, and that the third segment of the sensing signal has a linearly changing frequency over the third length of time.

Clause 26. The apparatus of any of clauses 19-25, wherein the means for obtaining the sensing signal configuration comprise means for determining the sensing signal configuration based on one or more range quality parameters or based on one or more velocity quality parameters or based on a combination of the one or more range quality parameters and the one or more velocity quality parameters.

Clause 27. The apparatus of any of clauses 19-26, wherein the sensing signal configuration provides frequency continuity of the sensing signal between consecutive segments of the sensing signal.

Clause 28. A non-transitory, processor-readable storage medium comprising processor-readable instructions to cause one or more processors of an apparatus to:
obtain a sensing signal configuration of a sensing signal in response to a request for radio frequency sensing, the sensing signal configuration indicating a first segment of the sensing signal with a monotonically increasing frequency over a first length of time, indicating a second segment of the sensing signal with a monotonically decreasing frequency over a second length of time, and indicating a third segment of the sensing signal with a monotonically changing frequency over a third length of time that is shorter than the first length of time and the second length of time; and
transmit the sensing signal configuration from the apparatus, or transmit the sensing signal from the apparatus, or transmit the sensing signal configuration and the sensing signal from the apparatus, or receive and measure the sensing signal at the apparatus, or any combination of two or more thereof.

Clause 29. The non-transitory, processor-readable storage medium of clause 28, wherein the sensing signal configuration indicates a fourth segment of the sensing signal with a constant frequency over a fourth length of time.

Clause 30. The non-transitory, processor-readable storage medium of clause 29, further comprising processor-readable instructions to cause the one or more processors to determine a velocity of a target object based on a first beat frequency based on a first measurement of the first segment of the sensing signal, a second beat frequency based on a second measurement of the second segment of the sensing signal, a third beat frequency based on a third measurement of the fourth segment of the sensing signal, and a range from a source of the sensing signal to the target object based on a fourth measurement of the third segment of the sensing signal.

Clause 31. The non-transitory, processor-readable storage medium of either clause 29 or clause 30, wherein the processor-readable instructions comprise the processor-readable instructions to cause the one or more processors to transmit the sensing signal, the non-transitory, processor-readable storage medium further comprising processor-readable instructions to cause the one or more processors to:

obtain a communication signal configuration that indicates a communication signal for transmission during at least a portion of the fourth length of time; and transmit, in accordance with the communication signal configuration, the communication signal during the at least a portion of the fourth length of time.

Clause 32. The non-transitory, processor-readable storage medium of any of clauses 29-31, wherein the sensing signal configuration indicates that the first length of time, the second length of time, the third length of time, and the fourth length of time are all within a single orthogonal frequency division multiplexed slot.

Clause 33. The non-transitory, processor-readable storage medium of any of clauses 28-32, wherein the sensing signal configuration indicates that the first segment of the sensing signal, the second segment of the sensing signal, and the third segment of the sensing signal each span a same range of frequencies.

Clause 34. The non-transitory, processor-readable storage medium of any of clauses 28-33, wherein the sensing signal configuration indicates that the first segment of the sensing signal has a linearly increasing frequency over the first length of time, that the second segment of the sensing signal has a linearly decreasing frequency over the second length of time, and that the third segment of the sensing signal has a linearly changing frequency over the third length of time.

Clause 35. The non-transitory, processor-readable storage medium of any of clauses 28-34, wherein the processor-readable instructions to cause the one or more processors to obtain the sensing signal configuration comprise processor-readable instructions to cause the one or more processors to determine the sensing signal configuration based on one or more range quality parameters or based on one or more velocity quality parameters or based on a combination of the one or more range quality parameters and the one or more velocity quality parameters.

Clause 36. The non-transitory, processor-readable storage medium of any of clauses 28-35, wherein the sensing signal configuration provides frequency continuity of the sensing signal between consecutive segments of the sensing signal.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. Thus, reference to a device in the singular (e.g., "a device," "the device"), including in the claims, includes one or more of such devices (e.g., "a processor" includes one or more processors, "the processor" includes one or more processors, "a memory" includes one or more memories, "the memory" includes one or more memories, etc.). The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or 10.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:
1. An apparatus comprising:
one or more transceivers;
one or more memories; and
one or more processors, communicatively coupled to the one or more transceivers and the one or more memories, and configured to:
obtain a sensing signal configuration of a sensing signal in response to a request for radio frequency sensing, the sensing signal configuration indicating a first segment of the sensing signal with a strictly monotonically increasing frequency over a first length of time, indicating a second segment of the sensing signal with a strictly monotonically decreasing frequency over a second length of time, indicating a third segment of the sensing signal with a strictly monotonically changing frequency over a third length of time that is shorter than the first length of time and the second length of time, and indicating a fourth segment of the sensing signal with a constant frequency over a fourth length of time; and
receive, via the one or more transceivers, and measure the sensing signal;
determine, based on a first plurality of measurements of the first segment of the sensing signal, a first plurality of first range-velocity relationships;
determine, based on a second plurality of measurements of the second segment of the sensing signal, a second plurality of second range-velocity relationships;
determine, based on a third plurality of measurements of the third segment of the sensing signal, a plurality of ranges;
determine, based on a fourth plurality of measurements of the fourth segment of the sensing signal, a third plurality of third range-velocity relationships; and
identify actual, non-ghost objects based on intersections of the first plurality of first range-velocity relationships, the second plurality of second range-velocity relationships, the third plurality of third range-velocity relationships, and the plurality of ranges.
2. The apparatus of claim 1, wherein the one or more processors are configured to transmit the sensing signal and the one or more processors are configured to:
obtain a communication signal configuration that indicates a communication signal for transmission during at least a portion of the fourth length of time; and
transmit, via the one or more transceivers and in accordance with the communication signal configuration, the communication signal during the at least a portion of the fourth length of time.
3. The apparatus of claim 1, wherein the sensing signal configuration indicates that the first length of time, the second length of time, the third length of time, and the fourth length of time are all within a single orthogonal frequency division multiplexed slot.

4. The apparatus of claim 1, wherein the sensing signal configuration indicates that the first segment of the sensing signal, the second segment of the sensing signal, and the third segment of the sensing signal each span a same range of frequencies.

5. The apparatus of claim 1, wherein the sensing signal configuration indicates that the first segment of the sensing signal has a linearly increasing frequency over the first length of time, that the second segment of the sensing signal has a linearly decreasing frequency over the second length of time, and that the third segment of the sensing signal has a linearly changing frequency over the third length of time.

6. The apparatus of claim 1, wherein the one or more processors are configured to determine the sensing signal configuration based on one or more range quality parameters or based on one or more velocity quality parameters or based on a combination of the one or more range quality parameters and the one or more velocity quality parameters.

7. The apparatus of claim 1, wherein the sensing signal configuration provides frequency continuity of the sensing signal between consecutive segments of the sensing signal.

8. A radio frequency sensing method comprising:

obtaining, at an apparatus, a sensing signal configuration of a sensing signal in response to a request for radio frequency sensing, the sensing signal configuration indicating a first segment of the sensing signal with a strictly monotonically increasing frequency over a first length of time, indicating a second segment of the sensing signal with a strictly monotonically decreasing frequency over a second length of time, indicating a third segment of the sensing signal with a strictly monotonically changing frequency over a third length of time that is shorter than the first length of time and the second length of time, and indicating a fourth segment of the sensing signal with a constant frequency over a fourth length of time;

receiving and measuring the sensing signal at the apparatus;

determining, at the apparatus and based on a first plurality of measurements of the first segment of the sensing signal, a first plurality of first range-velocity relationships;

determining, at the apparatus and based on a second plurality of measurements of the second segment of the sensing signal, a second plurality of second range-velocity relationships;

determining, at the apparatus and based on a third plurality of measurements of the third segment of the sensing signal, a plurality of ranges;

determining, at the apparatus and based on a fourth plurality of measurements of the fourth segment of the sensing signal, a third plurality of third range-velocity relationships; and identifying, at the apparatus, actual, non-ghost objects based on intersections of the first plurality of first range-velocity relationships, the second plurality of second range-velocity relationships, the third plurality of third range-velocity relationships, and the plurality of ranges.

9. The radio frequency sensing method of claim 8, wherein the radio frequency sensing method comprises transmitting the sensing signal, the radio frequency sensing method further comprising:

obtaining, at the apparatus, a communication signal configuration that indicates a communication signal for transmission during at least a portion of the fourth length of time; and transmitting, from the apparatus in accordance with the communication signal configuration, the communication signal during the at least a portion of the fourth length of time.

10. The radio frequency sensing method of claim 8, wherein the sensing signal configuration indicates that the first length of time, the second length of time, the third length of time, and the fourth length of time are all within a single orthogonal frequency division multiplexed slot.

11. The radio frequency sensing method of claim 8, wherein the sensing signal configuration indicates that the first segment of the sensing signal, the second segment of the sensing signal, and the third segment of the sensing signal each span a same range of frequencies.

12. The radio frequency sensing method of claim 8, wherein the sensing signal configuration indicates that the first segment of the sensing signal has a linearly increasing frequency over the first length of time, that the second segment of the sensing signal has a linearly decreasing frequency over the second length of time, and that the third segment of the sensing signal has a linearly changing frequency over the third length of time.

13. The radio frequency sensing method of claim 8, wherein obtaining the sensing signal configuration comprises determining the sensing signal configuration based on one or more range quality parameters or based on one or more velocity quality parameters or based on a combination of the one or more range quality parameters and the one or more velocity quality parameters.

14. The radio frequency sensing method of claim 8, wherein the sensing signal configuration provides frequency continuity of the sensing signal between consecutive segments of the sensing signal.

15. An apparatus comprising:

means for obtaining a sensing signal configuration of a sensing signal in response to a request for radio frequency sensing, the sensing signal configuration indicating a first segment of the sensing signal with a strictly monotonically increasing frequency over a first length of time, indicating a second segment of the sensing signal with a strictly monotonically decreasing frequency over a second length of time, indicating a third segment of the sensing signal with a strictly monotonically changing frequency over a third length of time that is shorter than the first length of time and the second length of time, and indicating a fourth segment of the sensing signal with a constant frequency over a fourth length of time;

means for receiving and measuring the sensing signal;

means for determining, and based on a first plurality of measurements of the first segment of the sensing signal, a first plurality of first range-velocity relationships;

means for determining, and based on a second plurality of measurements of the second segment of the sensing signal, a second plurality of second range-velocity relationships;

means for determining, and based on a third plurality of measurements of the third segment of the sensing signal, a plurality of ranges;

means for determining, and based on a fourth plurality of measurements of the fourth segment of the sensing signal, a third plurality of third range-velocity relationships; and means for identifying actual, non-ghost objects based on intersections of the first plurality of first range-velocity relationships, the second plurality of second range-velocity relationships, the third plurality of third range-velocity relationships, and the plurality of ranges.

16. The apparatus of claim 15, wherein the apparatus comprises the means for transmitting the sensing signal, the apparatus further comprising:

means for obtaining a communication signal configuration that indicates a communication signal for transmission during at least a portion of the fourth length of time; and means for transmitting, in accordance with the communication signal configuration, the communication signal during the at least a portion of the fourth length of time.

17. The apparatus of claim 15, wherein the sensing signal configuration indicates that the first length of time, the second length of time, the third length of time, and the fourth length of time are all within a single orthogonal frequency division multiplexed slot.

18. The apparatus of claim 15, wherein the sensing signal configuration indicates that the first segment of the sensing signal, the second segment of the sensing signal, and the third segment of the sensing signal each span a same range of frequencies.

19. A non-transitory, processor-readable storage medium comprising processor-readable instructions to cause one or more processors of an apparatus, for radio frequency sensing, to:

obtain a sensing signal configuration of a sensing signal in response to a request for radio frequency sensing, the sensing signal configuration indicating a first segment of the sensing signal with a strictly monotonically increasing frequency over a first length of time, indicating a second segment of the sensing signal with a strictly monotonically decreasing frequency over a second length of time, indicating a third segment of the sensing signal with a strictly monotonically changing frequency over a third length of time that is shorter than the first length of time and the second length of time, and indicating a fourth segment of the sensing signal with a constant frequency over a fourth length of time;

receive and measure the sensing signal at the apparatus;

determine, based on a first plurality of measurements of the first segment of the sensing signal, a first plurality of first range-velocity relationships;

determine, based on a second plurality of measurements of the second segment of the sensing signal, a second plurality of second range-velocity relationships;

determine, based on a third plurality of measurements of the third segment of the sensing signal, a plurality of ranges;

determine, based on a fourth plurality of measurements of the fourth segment of the sensing signal, a third plurality of third range-velocity relationships; and identify actual, non-ghost objects based on intersections of the first plurality of first range-velocity relationships, the second plurality of second range-velocity relationships, the third plurality of third range-velocity relationships, and the plurality of ranges.

20. The non-transitory, processor-readable storage medium of claim 19, wherein the processor-readable instructions comprise the processor-readable instructions to cause the one or more processors to transmit the sensing signal, the non-transitory, processor-readable storage medium further comprising processor-readable instructions to cause the one or more processors to:

obtain a communication signal configuration that indicates a communication signal for transmission during at least a portion of the fourth length of time; and transmit, in accordance with the communication signal configuration, the communication signal during the at least a portion of the fourth length of time.

21. The non-transitory, processor-readable storage medium of claim 19, wherein the sensing signal configuration indicates that the first length of time, the second length of time, the third length of time, and the fourth length of time are all within a single orthogonal frequency division multiplexed slot.

22. The non-transitory, processor-readable storage medium of claim 19, wherein the sensing signal configuration indicates that the first segment of the sensing signal, the second segment of the sensing signal, and the third segment of the sensing signal each span a same range of frequencies.

\* \* \* \* \*